(12) United States Patent
Ferrante

(10) Patent No.: US 6,850,208 B1
(45) Date of Patent: Feb. 1, 2005

(54) APPARATUS AND METHOD OF MERCHANDIZING PRODUCTS

(75) Inventor: Anthony B. Ferrante, Canton, OH (US)

(73) Assignee: Rubbermaid Incorporated, Wooster, OH (US)

( * ) Notice: Subject to any disclaimer, the term of this patent is extended or adjusted under 35 U.S.C. 154(b) by 154 days.

(21) Appl. No.: 09/922,757

(22) Filed: Aug. 6, 2001

Related U.S. Application Data
(60) Provisional application No. 60/225,143, filed on Aug. 14, 2000.

(51) Int. Cl.$^7$ .............................. G09G 5/00; A47G 1/06; G09B 25/00
(52) U.S. Cl. ............................ 345/1.1; 40/725; 434/382
(58) Field of Search ............................... 211/49.1, 59.2, 211/65, 70.7, 70.6, 85.26, 71.01; 40/606.01, 606.03, 606.14, 642.01, 642.02, 725; 345/1.1; 434/365, 382, 428, 429, 430

(56) References Cited

U.S. PATENT DOCUMENTS

| | | | | |
|---|---|---|---|---|
| 3,098,568 A | | 7/1963 | Pierre ........................... 211/60 |
| 3,799,357 A | | 3/1974 | Govang ......................... 211/59 |
| 4,378,884 A | * | 4/1983 | Anderson ................. 206/459.5 |
| 4,576,291 A | | 3/1986 | Stein .......................... 211/49.1 |
| 4,687,094 A | | 8/1987 | Allsop et al. ............. 206/44 R |
| 4,723,663 A | | 2/1988 | Learn ......................... 211/59.2 |
| D317,992 S | | 7/1991 | Miller .......................... D6/566 |
| D320,719 S | | 10/1991 | Kolsrud et al. ............... D6/533 |
| D327,187 S | | 6/1992 | Swon .......................... D6/553 |
| 5,224,609 A | * | 7/1993 | Bauer et al. ................... 211/65 |
| 5,234,113 A | * | 8/1993 | Ramey ....................... 211/59.4 |
| 5,346,076 A | * | 9/1994 | Hart ......................... 211/86.01 |
| 5,573,115 A | * | 11/1996 | Fuller ........................... 211/65 |
| 5,611,440 A | | 3/1997 | Møller ....................... 211/70.7 |
| 5,704,497 A | | 1/1998 | Wyatt ......................... 211/163 |
| 5,797,755 A | * | 8/1998 | Montgomery ............... 434/429 |
| 5,810,177 A | | 9/1998 | Cabiran ..................... 211/70.6 |
| 5,810,179 A | | 9/1998 | Kleiman .................. 211/88.01 |
| D413,034 S | | 8/1999 | Markson ..................... D6/553 |
| 5,957,422 A | | 9/1999 | Shea ..................... 248/220.31 |
| 6,070,747 A | | 6/2000 | Shea ....................... 211/87.01 |

* cited by examiner

Primary Examiner—Chanh Nguyen
Assistant Examiner—Paul A Bell
(74) Attorney, Agent, or Firm—Marshall, Gerstein & Borun LLP

(57) ABSTRACT

A display system for displaying products at a store, the display system includes a first module configured to display a first cleaning product, a second module adjacent the first module and configured to display a second cleaning product which is related to the first cleaning product, and an information display coupled to the first and second modules and configured to be visible when cleaning products are being displayed. The information display provides graphical information that associates the first cleaning product with a particular cleaning task and associates the second cleaning product with the first cleaning product. A method of merchandizing cleaning products includes the step of providing a plurality of cleaning products, organizing the plurality of cleaning products according to a particular cleaning task, providing one or more information displays configured to identify a particular cleaning product for the particular cleaning task, to pictorially display an associated work environment, and to provide related product information.

18 Claims, 11 Drawing Sheets

APPARATUS AND METHOD OF MERCHANDIZING PRODUCTS

CROSS-REFERENCE TO RELATED APPLICATIONS

The present invention claims priority under 35 U.S.C. § 119 from U.S. Provisional Patent Application No. 60/225,143 titled "APPARATUS AND METHOD OF MERCHANDISING PRODUCTS" filed Aug. 14, 2000, the full disclosure of which is hereby incorporated by reference.

FIELD OF THE INVENTION

The present invention relates to an apparatus and method of merchandising products or services, and more particularly to an apparatus for organizing, shipping, displaying, and merchandising cleaning products.

BACKGROUND OF THE INVENTION

It is generally known to provide display racks for organizing and displaying products for sale. Known display racks typically include containers or peg hooks mounted to a pegboard to store and display products and their prices.

However, known display racks have several disadvantages. For example, known display racks tend to easily become disorganized and take a long time to "clean up." Also, known display racks do not adequately inform potential customers about the products or how the products are intended to be used. Likewise, known display racks do not adequately inform stockpersons about the proper display and arrangement of the products.

To provide a reliable, widely adaptable apparatus and method of merchandising products, which avoids the above-referenced and other problems, would represent a significant advance in the art. Accordingly, it would be desirable to provide for an apparatus and method of merchandising products having one or more of these or other advantageous features.

SUMMARY

It is a primary feature of the present invention to provide an improved apparatus and method for merchandising products.

Another feature of the present invention is to provide a display system intended to educate potential customers about products for a particular task or work environment; to categorize and organize product by intended task or solution; to identify features and benefits of products; to assist the consumer in finding a particularly desired item such as subparts, repair parts, related or associated products, and the like.

Another feature of the present invention is to provide retailers a display system intended to reduce setup time; simplify stocking and restocking of products; simplify inventory review of the display system; reduce the use of peg hooks and their set up; simplify "cleaning" of the display; better organize products; advertise related items; provide an adjustable and modular display system; and the like.

How the above-referenced and other features are accomplished, individually, collectively, or in various subcombinations, will be described in the following detailed description of the preferred and other exemplary embodiments, taken in conjunction with the FIGURES. Generally, however, they are accomplished by providing a display system for displaying products at a store, the display system including a first module configured to display a first cleaning product, a second module adjacent the first module and configured to display a second cleaning product which is related to the first cleaning product, and an information display coupled to the first and second modules and configured to be visible when cleaning products are being displayed. The information display provides graphical information that associates the first cleaning product with a particular cleaning task and associates the second cleaning product with the first cleaning product.

The above-referenced and other features may also be accomplished by a method of merchandising products, the method including providing a display system for use in organizing and displaying a first product and a second product which is related to the first product, and providing graphical information of the first and second products on one or more information displays, wherein the graphical information is configured to pictorially display a particular work environment for one of the first and second product, and to identify the second product as being related to the first product.

The above-referenced and other features may also be accomplished by a method of merchandising cleaning products, the method including providing a plurality of cleaning products, organizing the plurality of cleaning products according to a particular cleaning task, providing one or more information displays configured to identify a particular cleaning product for the particular cleaning task, to pictorially display an associated work environment, and to provide related product information.

The present disclosure further relates to various features and combinations of features shown and described in the disclosed invention. Other ways in which the objects of the present invention are accomplished will be described in the following specification or will become apparent to those skilled in the art after they have read this specification. Such other ways are deemed to fall within the scope of the present invention if they fall within the scope of the claims which follow.

DETAILED DESCRIPTION OF PREFERRED AND OTHER EXEMPLARY EMBODIMENTS

Figure 1:
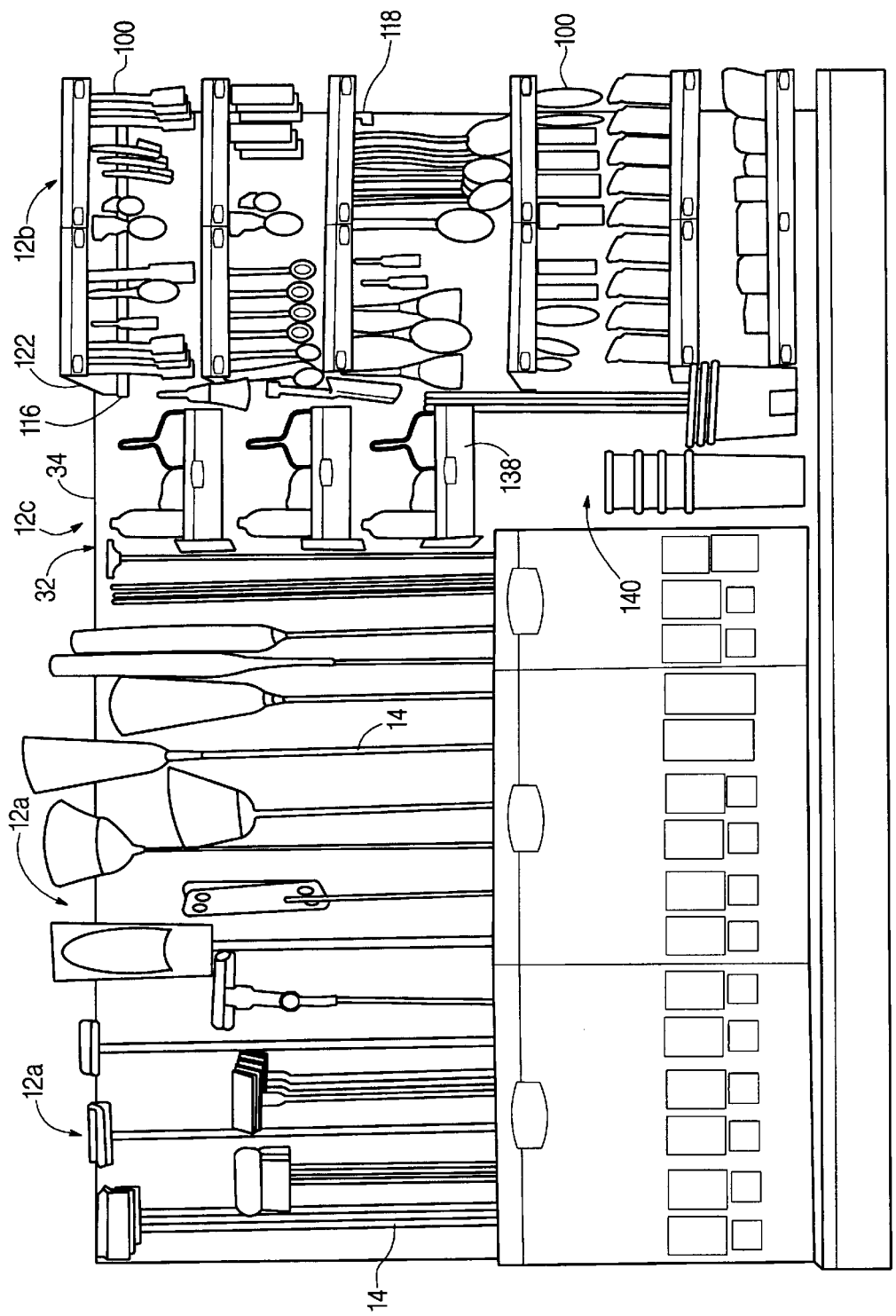
FIG. 1 is a perspective view of a display system, according to a preferred embodiment.

Before proceeding to the detailed description of the preferred and other exemplary embodiments, several comments can be made about the general applicability and the scope thereof.

First, the exemplary embodiments described herein are configured to provide an organized, informative, and efficient display system for storing, displaying, and merchandising products and/or services. The products or services may include any of a variety of products or services that are offered for sale at retail locations or other places of point of sale or advertisement locations. More particularly, the products offered for sale may be related or somehow associated (e.g., related product lines, same manufacturer, or the like). The present disclosure is also intended to have a wider applicability to a variety of products or services, including, but not limited to, cleaning implements or products, gardening or landscaping tools, etc. The display system for cleaning products, for example, as shown in the FIGURES, may be organized according to a cleaning task (e.g., mopping, dusting, sweeping, etc.). Cleaning products may include "stick goods (e.g., brooms, mops, etc.), "small wares" (e.g., brushes, sponges, scourers, etc.), "refills" or replacement portions and the like. In one area or portion shown as a module of the display system, the displayed cleaning product is placed next to its "refill" products and information about its usage and functionality.

Second, each information display or board is intended to provide information about the associated products. Preferably, the information is textual and/or pictorial. Textual information may include description of the displayed product, instructions on how to use the product, its history, related or associated products (e.g., refills, repair parts, replacement parts, etc.), contact information (e.g., addresses, telephone numbers, website, etc.), information on the manufacturer, features, functionality, benefits or advantages, comparative advertising, advertising of other products, product names, price information, part numbers, alternative uses of the cleaning product, general cleaning "tips," "technical" information, brochures, coupons, and any of a variety other information that would be helpful to the consumer or the retailer employees. Pictorial information may include images showing the product, the intended work environment (s), the product being used, related or associated products, trademark or other indicia, the product being assembled, repaired, refilled, and the like, photographs, schematic illustrations, and any of a variety of other information which could be displayed pictorially. The arrangement of the information display is also intended to provide information to the retailer relating to proper stocking of the display system, inventory information, product numbers, and the like. Preferably, graphical information is displayed adjacent (e.g., nearby, behind, next to, in front of, etc.) the products that the information pertains to.

Third, the apparatus and method of merchandising products is intended to be modular. The size or quantity of the various associated modules, containers, bins, accessories, information boards, and the like can be widely varied. Also, the structural components employed to display information or merchandise the products is also illustrative. As such, the display system may be changed or adapted for new or different products, increased or decreased according to allocated "floor space," new display technologies, and the like.

Proceeding now to descriptions of the preferred and exemplary embodiments, FIG. 1 is a front perspective view of a display system 10 according to a preferred embodiment. Display system 10 is configured to provide graphical information for associated products. The products are organized according to a cleaning task (cleaning products, for example, may be organized by task such as mopping, dusting, sweeping, etc.). In one portion of display system 10 (e.g., a module 12) the cleaning product is placed next to related products (e.g., "refills," repair parts, etc.) and information about their usage and functionality. For example, such cleaning products may include "stick goods" (e.g., brooms, mops, etc.) "small wares" (brushes, sponges, scourers, etc.), "refills" or replacement portions, etc. For the customer, display system 10 is intended to educate him or her as to the proper cleaning products to be used for a particular cleaning task or work environment (e.g., provide cleaning solutions to cleaning tasks); categorize and organize the cleaning products by cleaning task or cleaning solution; identify features and benefits of products; assist the consumer in finding a particularly desired item such as a refill, etc. For the retailer, display system 10 is intended to reduce setup time for a cleaning implement display; simplify stocking and restocking of products; simplify review of inventory of display system 10; reduce the use of peg hooks and their set up; simplify "cleaning" of display; better organize products; advertise related items.

Figure 2:
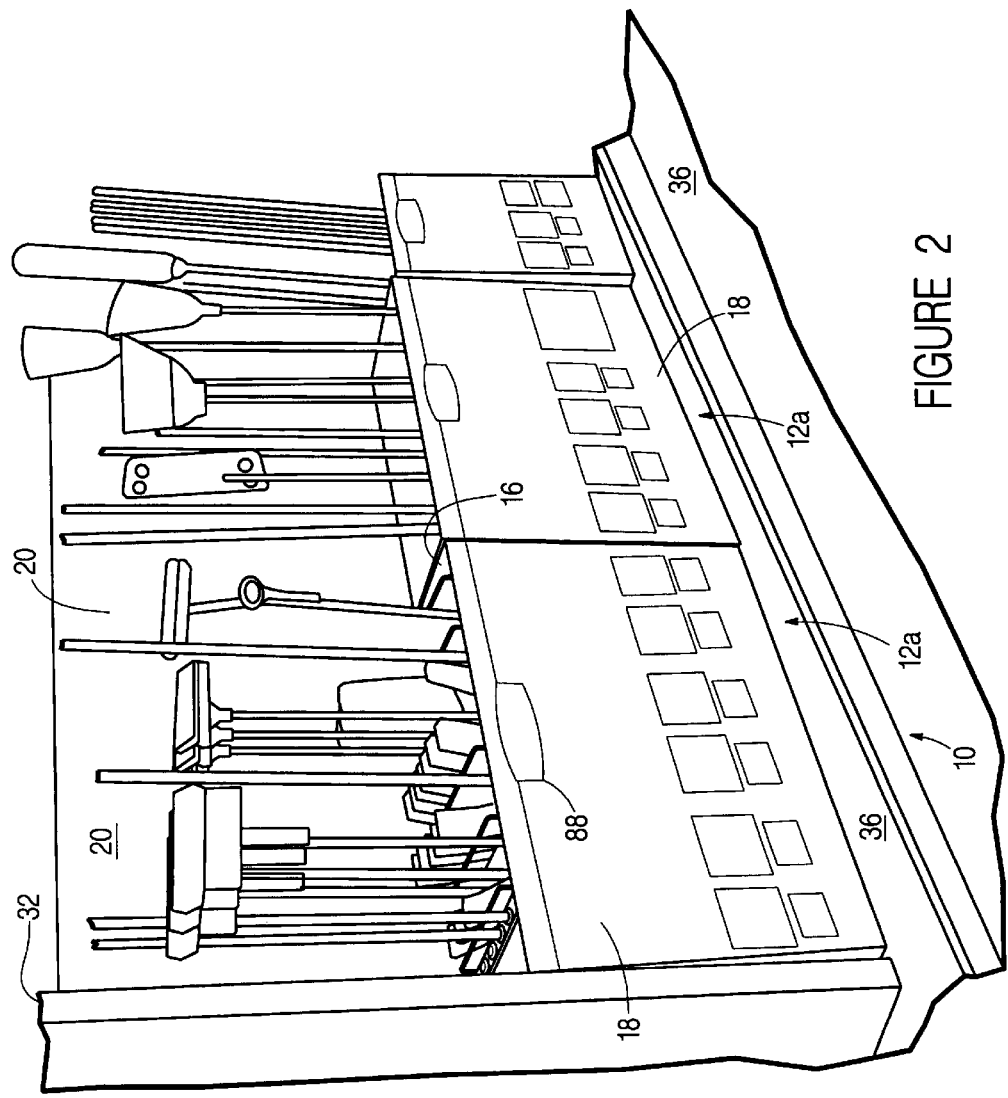
FIG. 2 is a fragmentary perspective view of the display system of FIG. 1.

Display system 10 includes a plurality of sections or modules 12a, 12b, 12c. Modules 12a, 12b, 12c have any of a variety of configurations and arrangements, depending of the desired display needs, the availability of space, the variety or quantity of items being displayed, etc. For example, as shown in FIGS. 1 and 2, modules are provided in two-foot and four-foot increments, but a variety of increments may be employed.

Module 12a is directed to merchandising, organizing, and displaying a variety of cleaning products commonly referred to as stick goods 14 (e.g., broom, mop, duster, etc.). As shown in FIGS. 1 and 2, module 12a includes an information display (shown as an information board 18), a rack 16, and a backboard 20. Module 12a is configured to minimize the use of a multitude of individual display hooks, which may require tedious arrangement stocking by a retailer's stock person; and to present stick goods 14 in an organized and appealing manner.

Figure 3:
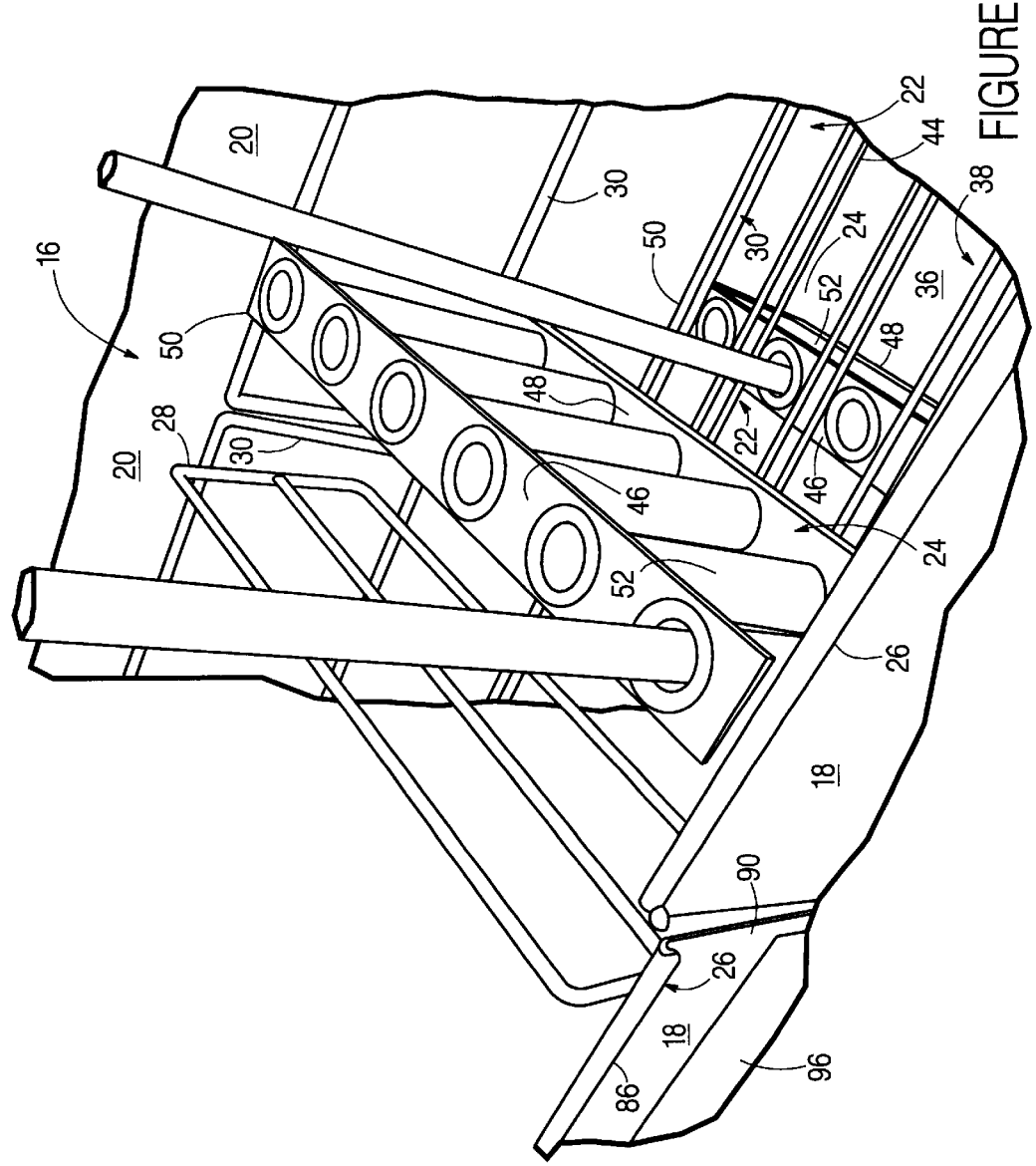
FIG. 3 is a fragmentary perspective view of a frame for the display system.
Figure 4:
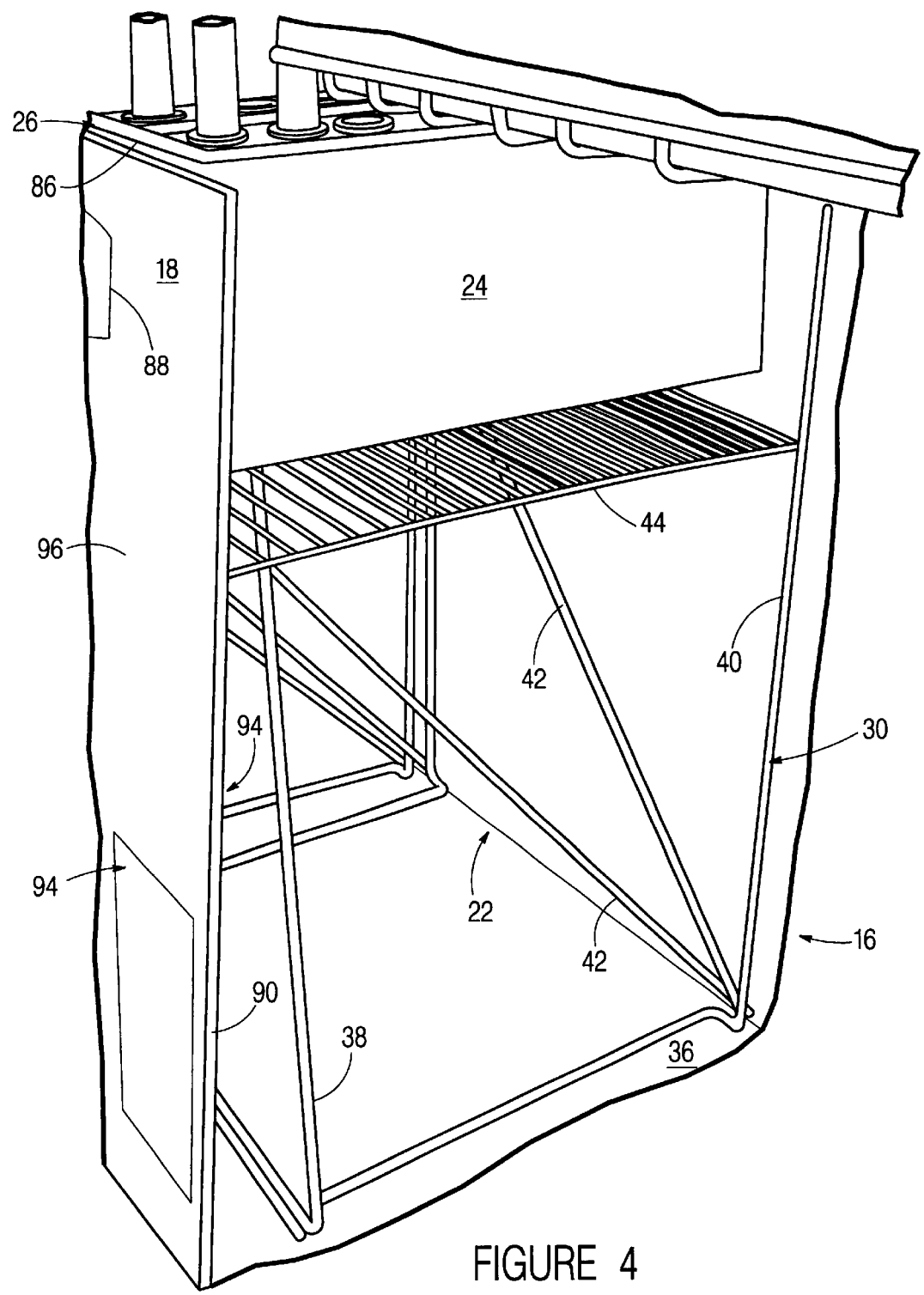
FIG. 4 is a fragmentary perspective view of a frame for the display system.

Information board 18 is configured to provide information to the consumer including a description of the displayed cleaning product, a suggested method of using the cleaning product, alternative uses of the cleaning product, general cleaning "tips," and "technical" information (such as part numbers, manufacturer contact information (e.g., address, telephone numbers, website, etc.), refill part information, related product information, brochures, coupons, etc.). Information board 18 is also configured to provide information to the retailer including stocking information, inventory information, product numbers, etc. Information displayed on information board 18 may include a combination of text and graphics (e.g., photographs, schematic depictions, etc.). Information board 18 may also include indicia 88 of the source of origin of the cleaning products for advertisement purposes and to assist the consumer and retail stockperson in identifying product location. As shown in FIGS. 3 and 4, information board includes a core 90 having a front surface 92, a back surface 94. Information sheets 96 are attached (e.g., by adhesive, tacks, etc.) to front surface 92 and/or back surface 94 (for convenient and efficient product charge) and may include graphics, text, or the like. For example, information board 18 may provide information regarding "squeeze mops," "butterfly mops," "roller mops," "dust mops," "indoor brooms," "outdoor brooms," "twist mops," and "handles."

Rack 16 is configured to provide a support structure and system for organizing, displaying, and merchandising displayed products (shown as stick goods 14). As shown in FIGS. 3 and 4, rack 16 includes a frame 22, a tube assembly 24, a mounting bracket 26, and one or more bins 28. Rack 16 is made of metal, but any of a variety of materials may be used such as plastic, wood, etc., and painted (e.g., cobalt blue), but any of a variety of colors and finishes may be applied.

Frame 22 is configured to provide a support structure for a tube assembly 24, a mounting bracket 26, and one or more bins 28. Frame 22 is a freestanding structure having any of a plurality of rods 30 that are bent and painted. Alternatively, frame 22 may be coupled to retailer's display arrangement 32 (e.g., pegboard 34), wall, or floor 36 using any of a variety of brackets, fasteners or other attachment or mounting arrangements. Frame 22 includes a front portion 38 coupled to a back portion 40 by a plurality of laterally disposed and diagonally disposed rods 42. A middle shelf 44 (shown as ventilated wire shelving) is disposed between the top and bottom of frame 22 and is configured to provide a supporting surface for stick goods 14. Middle shelf 44 may be raised or lowered relative to frame 22 depending on the size of stick good 14 intended to be displayed. Middle shelf 44 also provides a catch basin for products that are not properly placed or replaced in rack 16 (e.g., when a customer removes an item from display system 10, decides to not purchase it, and drops it between bins 28 and tube assemblies 24). Shelf 44 collects such discarded items within an arm's reach of the retailer's stock person. As such, display system 10 may be easily cleaned and reorganized. According to alternative embodiments, frame 22 components may be made from any of a variety of materials and arrangements (including plastic, metal, or the like).

Tube assembly 24 is configured to display stick goods and to provide an easy to understand location for placing or replacing the displayed product. As shown in FIGS. 2-5, tube assembly 24 is coupled to front portion 38 and back portion 40 of the frame 22. Tube assembly 24 is positioned above middle shelf 44 and attached (e.g., welded) to front portion 38 and back portion 40. Alternatively, tube assembly 24 is positioned below middle shelf 44 and attached to front portion 38, back portion 40, and middle shelf 44 (e.g., for longer stick goods 14). According to an exemplary embodiment, ends of upper plate 46 and/or lower plate 48 of tube assembly 24 include downwardly facing hooks 50 configured to engage front portion 38 and back portion 40 so that tube assembly 24 may be selectively suspended or placed in module 12a (which allows for efficient set-up and reconfiguration for a variety of different cleaning products).

Tube assembly 24 includes a spaced apart upper plate 46 and lower plate 48 and one or more sleeves or tubes 52. Upper plate 46 includes a plurality of apertures 54 that receive one of tubes 52. Tubes 52 are configured to receive any of a variety of stick goods 14. According to an alternative embodiment, tube assembly 24 is provided with a stick good restriction element which is intended to prevent a product not intended to be displayed in the display system from being placed in the tube assembly (e.g., products not related to information provided on display board 18, products not sold or manufactured by the manufacturer, etc.). One type of such a stick good restriction element include tubes that are shaped so that only a specially-shaped stick good may be inserted into tube (e.g., by an aperture having a profile that corresponds to an associated profile on the product).

Figure 6:
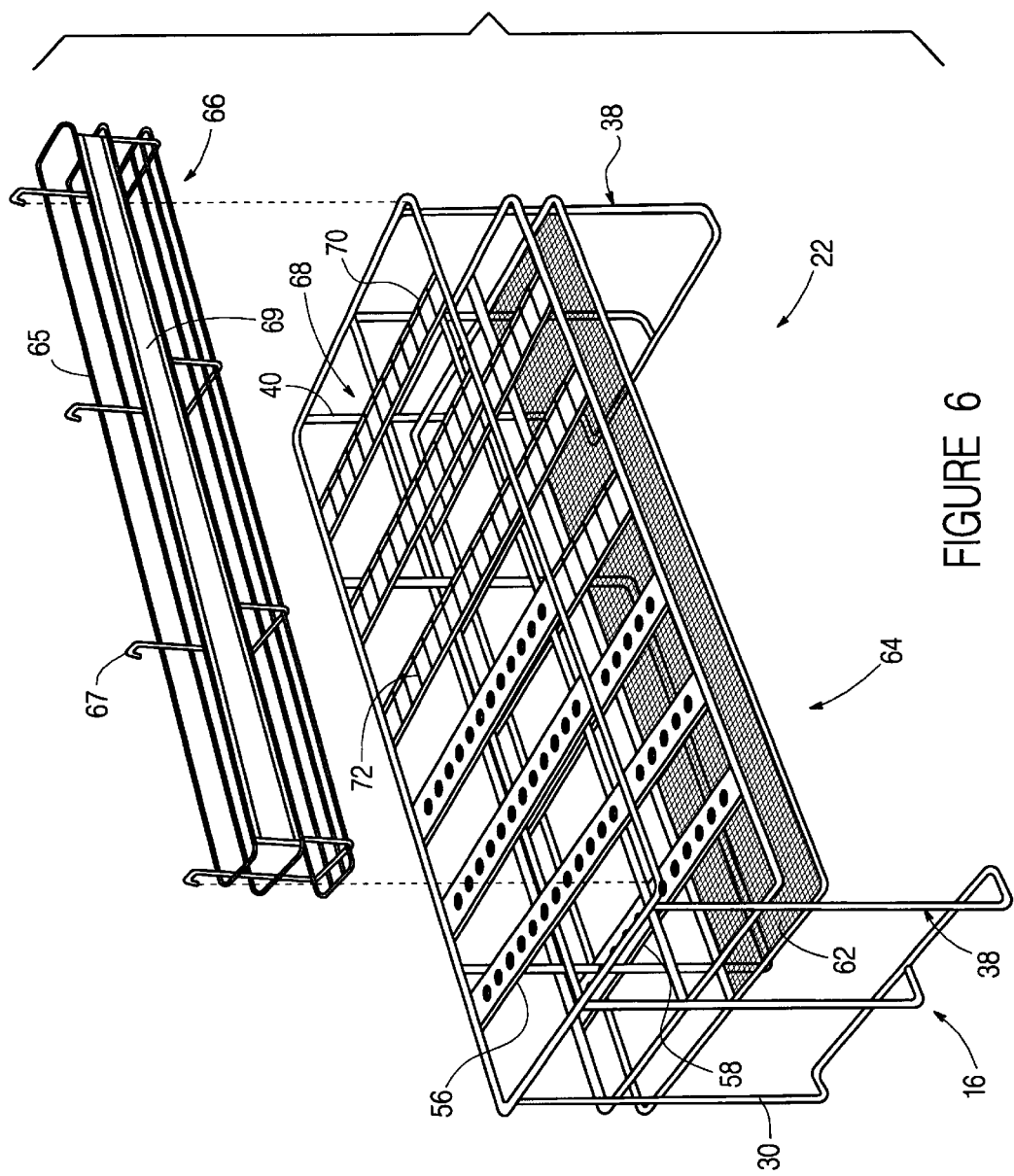
FIG. 6 is a fragmentary perspective view of a container for the display system according to an exemplary embodiment.

FIG. 6 shows an alternative embodiment of rack 16. As shown in FIG. 6, rack 16 includes upper and lower elongate members 56, 58 having a plurality of corresponding apertures 60 to receive stick goods 14. Stick goods 14 are inserted through the plurality of apertures 60 and are supported by a mesh or screen 62 disposed below elongate members 56, 58. A space 64 is provided below frame 22 for additional related products (e.g., mop buckets for mops or the like). Front portion 38 of frame 22 includes a hang unit or basket 66 for refills or related products. As shown in FIG. 6, basket 66 includes a wire frame 65 with a plurality of hooks 67 to couple with front portion 38 of frame 22 of rack 16, and a display bracket 69 for receiving display cards or the like.

An elongate member 68 is provided for receiving stick goods 14. Elongate member 68 includes a pair of spaced apart parallel rods 70 connected by a plurality of perpendicular rods 72. Stick goods 14 are inserted between rods 70 and rods 72.

Figure 10:
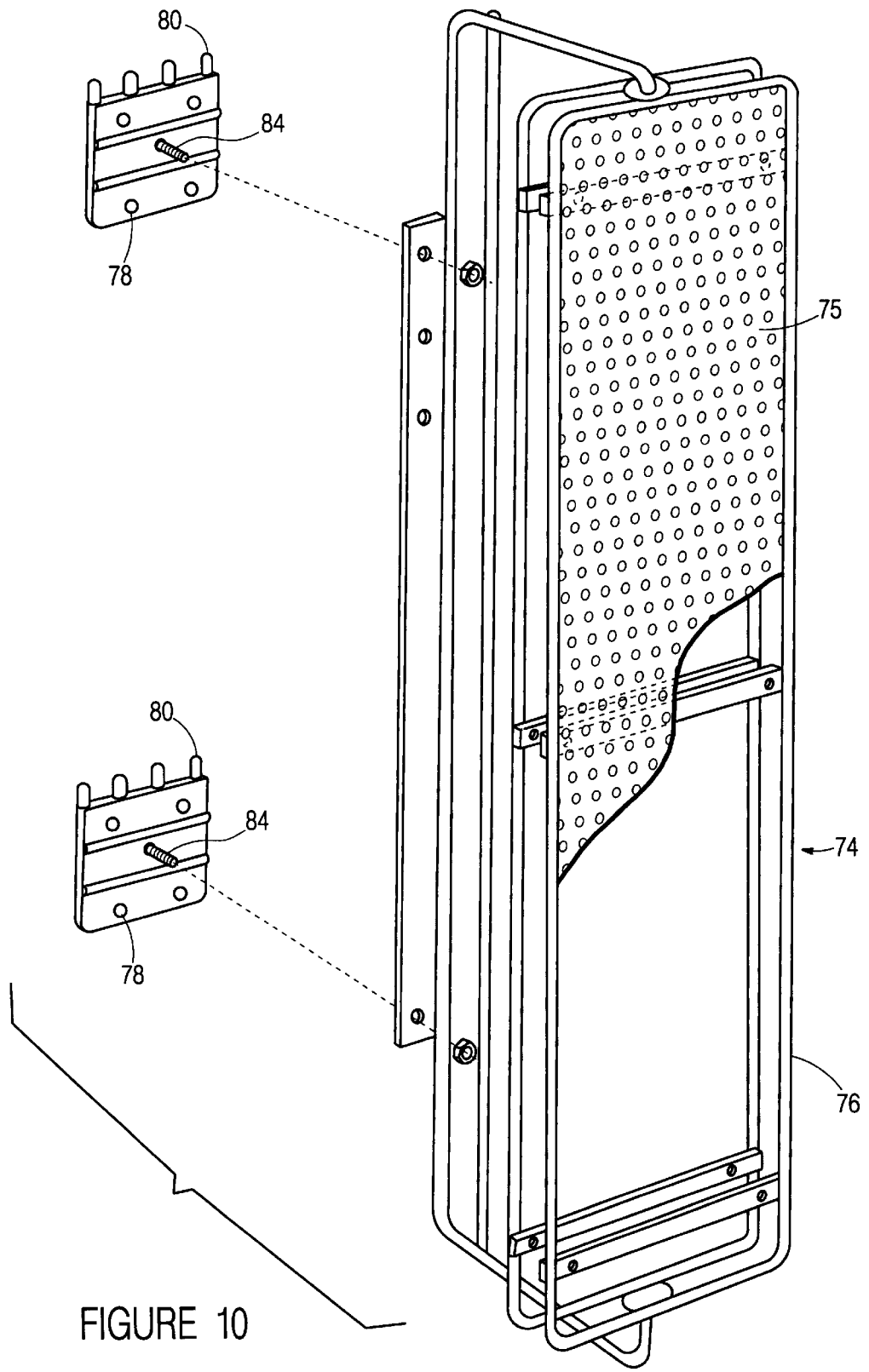
FIG. 10 is a perspective view of a carousal for the display system.

FIG. 10 shows a carousel 74 for displaying any of a variety of products on one or more panels 75. Panels 75 include a mountable surface (e.g., a pegboard as shown, shelving, etc.). According to a preferred embodiment, two pegboard panels (e.g., "double panels") are mounted a spaced apart distance from each other such that the display hooks do not interfere with each other when placed in the pegboard. According to an alternative embodiment, panels 75 include a plurality of metal cross bars or a mesh basket to hold products. Carousel 74 includes a frame 76 that couples to system 10 or other vertical surface by a pair of back plates 78. Plates 78 include a plurality of hooks or pegs 80 that engage pegboard 34 or other mounting surface. Threaded studs 84 extend outwardly from back plates 78 for coupling frame 76 of carousel 74 to back plates 78. Any of a variety of cleaning products may be displayed and arranged on panels 75 of carousel 74. According to a preferred embodiment, carousel 74 is five feet or less so that it may work with existing gondolas in stores. According to alternative embodiments, carousel 74 may be any of a variety of sizes and profiles.

As shown in FIGS. 3 and 4, mounting bracket 26 is configured to receive information board 18. Mounting bracket 26 is coupled to front portion 38 of frame 22 (e.g., by welding, fasteners, etc.). Mounting bracket 26 is shown as a downwardly facing U-shaped member 86 that is configured to receive and secure information board 18. A second mounting bracket 26 may be coupled to the bottom of front portion 38 so that U-shaped member 86 is upwardly facing so that information board 18 is captured between mounting brackets 26.

Bins 28 are configured to be mounted to frame 22 at a variety of locations, preferably adjacent tube assemblies 24 so that related products (e.g., refills, add-on items, etc.) may be easily found by the consumer and the retail stockperson when replenishing display system 10. As such, the consumer can identify the correct related product based on information displayed on information boards 18, identification of related cleaning products, or its displayed appearance.

Figure 11:
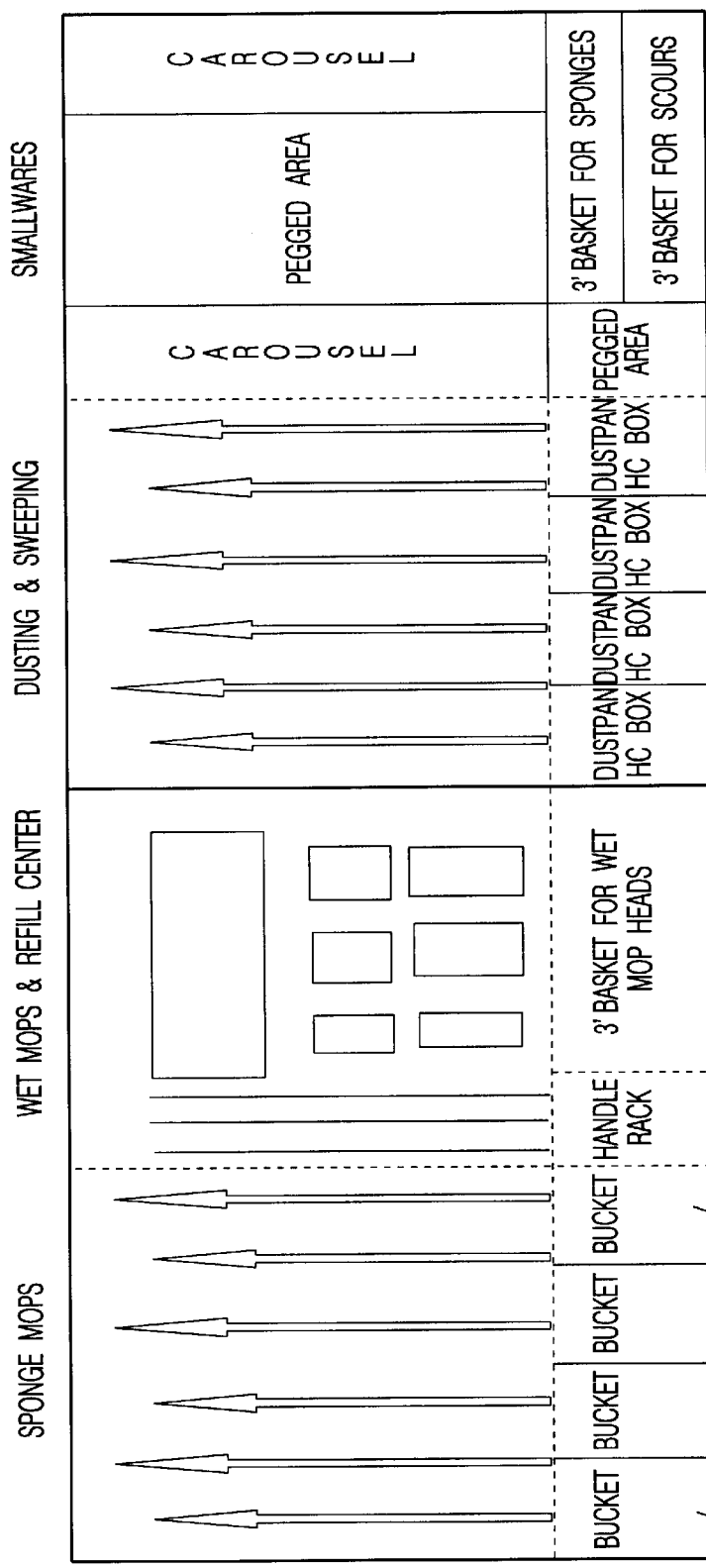
FIG. 11 is a schematic front elevation view of a display system according to an exemplary embodiment.

Backboard 20 may be mounted to the retailer's shelving apparatus 32 (e.g., pegboard 34, walls, etc.) by brackets 97 that attach to backboard 20 and engage peg board 34. Alternatively, backboard 20 may attach to the retailer's shelving apparatus 32 using any of a variety of fasteners (e.g., screw, bold, latch-hook, etc.). As shown in FIGS. 1 and 2, backboard 20 may be configured and ornamented to display the actual work surface that the cleaning implement is directed towards (e.g., ceramic or vinyl flooring, wood floors, concrete, etc.). Alternatively, backboard may include a sheet attached to a front surface of a core. Sheet includes graphics, text, etc. Alternatively, background may be configured and ornamented to provide a plain background. Alternatively, background may include product information in place of or in addition to information board 18. As shown in FIG. 11, when background provides product information in place of information boards, additional products 98 may be displayed, organized, and merchandised below middle shelf 44. As such, complementary products may be merchandised along with their related cleaning product. For example, mop buckets may be arranged below and/or in front of frame 22 so that the consumer does not have to look elsewhere.

Figure 5:
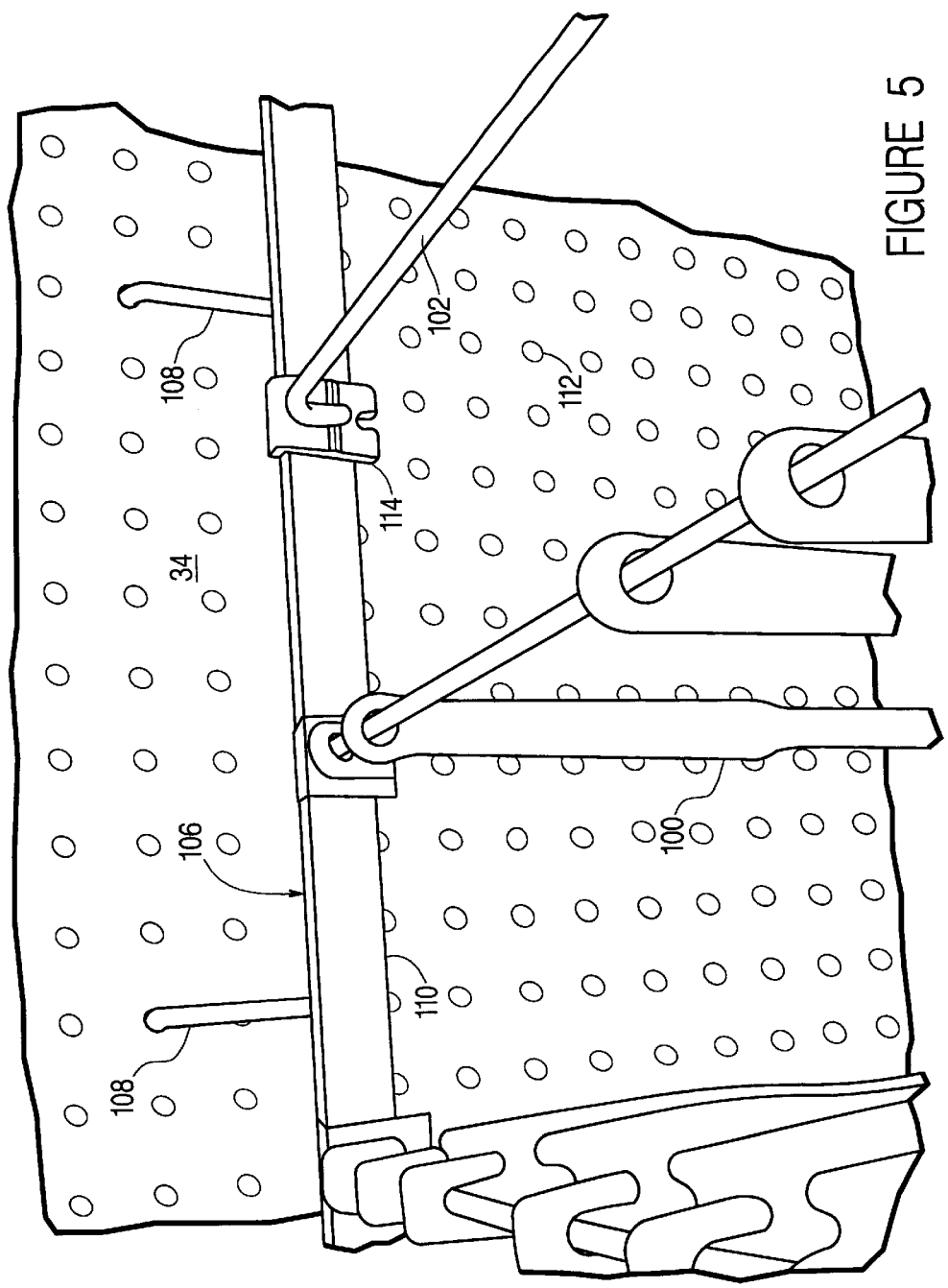
FIG. 5 is a fragmentary perspective view of the display system.

Module 12b, as shown in FIGS. 1 and 5, displays small wares 100 which are suspended from a display hook 102 or organized in a bin or basket 104. Display hooks 102 are coupled to a display hook rack 106 which is attached to apparatus 32, such as a pegboard 34, by any of a variety of techniques. As shown in FIG. 5, display hook rack 106 includes a plurality of bent rods 108 that extend from a longitudinal plate 110 and engage apertures 112 in pegboard 34 to secure display hook rack 106 in place. Engagement of rods 108 of display hook rack 106 requires that display hook rack 106 be substantially level and is configured to assist the retail stock person in this task. Plate 110 is disposed at a spaced apart distance from pegboard 34 by the plurality of rods 108. Display hook 102 couples to plate 110 by a U-shaped, downwardly facing bracket 114. Bracket 114 is slid over plate 110 and may be selectively positioned (or repositioned) between the ends 116, 118 of plate 110 of display hook rack 106. A front display bracket 120 is coupled to plate 110 by a pair of rods 122. Front display bracket 120 is configured to receive a display card 124 that includes information relating to the displayed product suspended by display hook 102. Instead of inserting a plurality of conventional display hooks, (which requires careful placement of the display hooks to ensure a level and evenly spaced arrangement), display hook rack 106 is coupled to pegboard 34 in substantially a single step.

Figure 7:
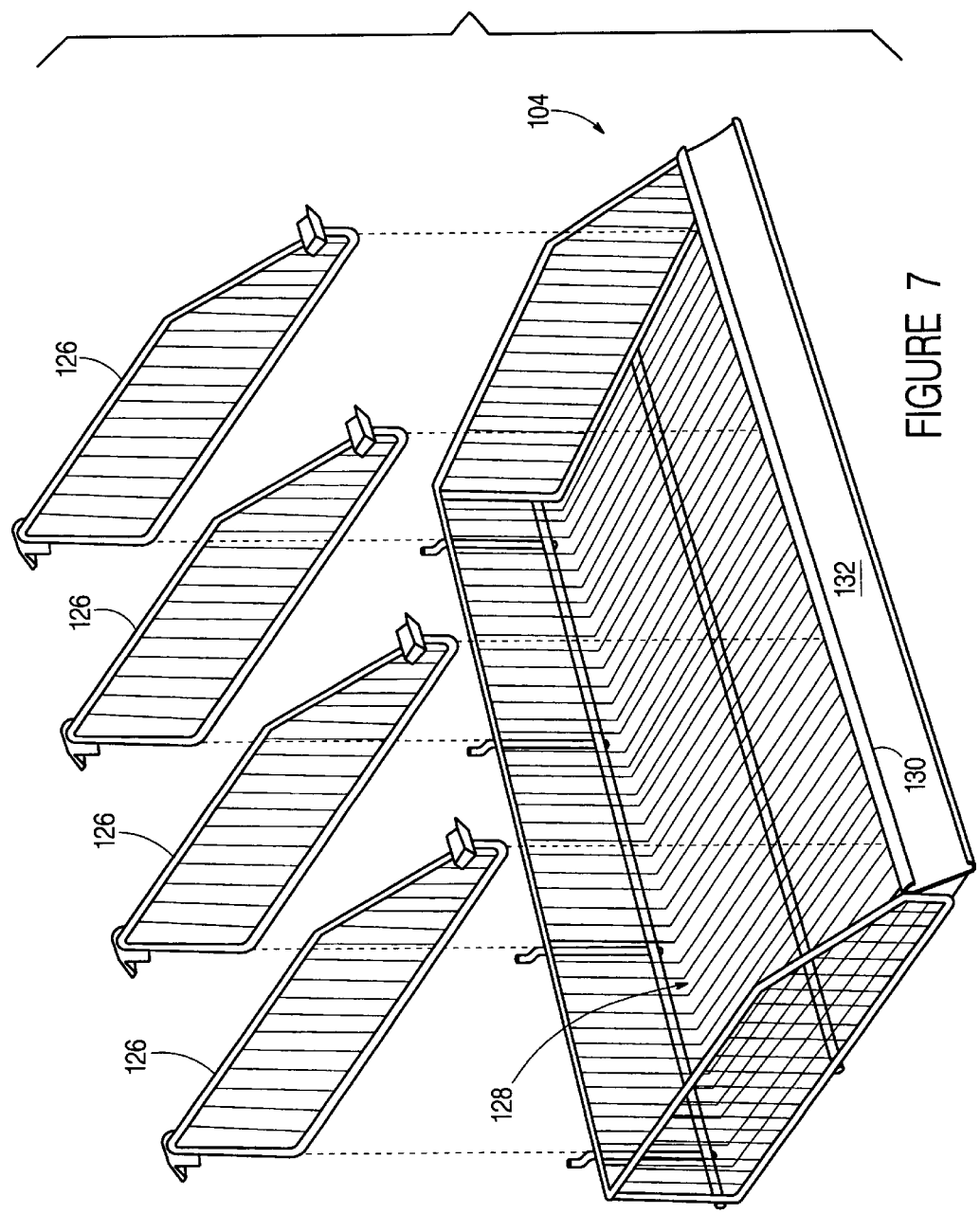
FIG. 7 is a perspective view of a container for the display system according to an exemplary embodiment.

As shown in FIG. 7, basket 104 includes one or more dividers 126 configured to provide a plurality of compartments 128 configured to display a variety of products and provide for efficient stocking by the retail stock person and for easy selection by the consumer. A front display bracket 130 is coupled to basket 104 and configured to receive a display card 132.

Figure 8:
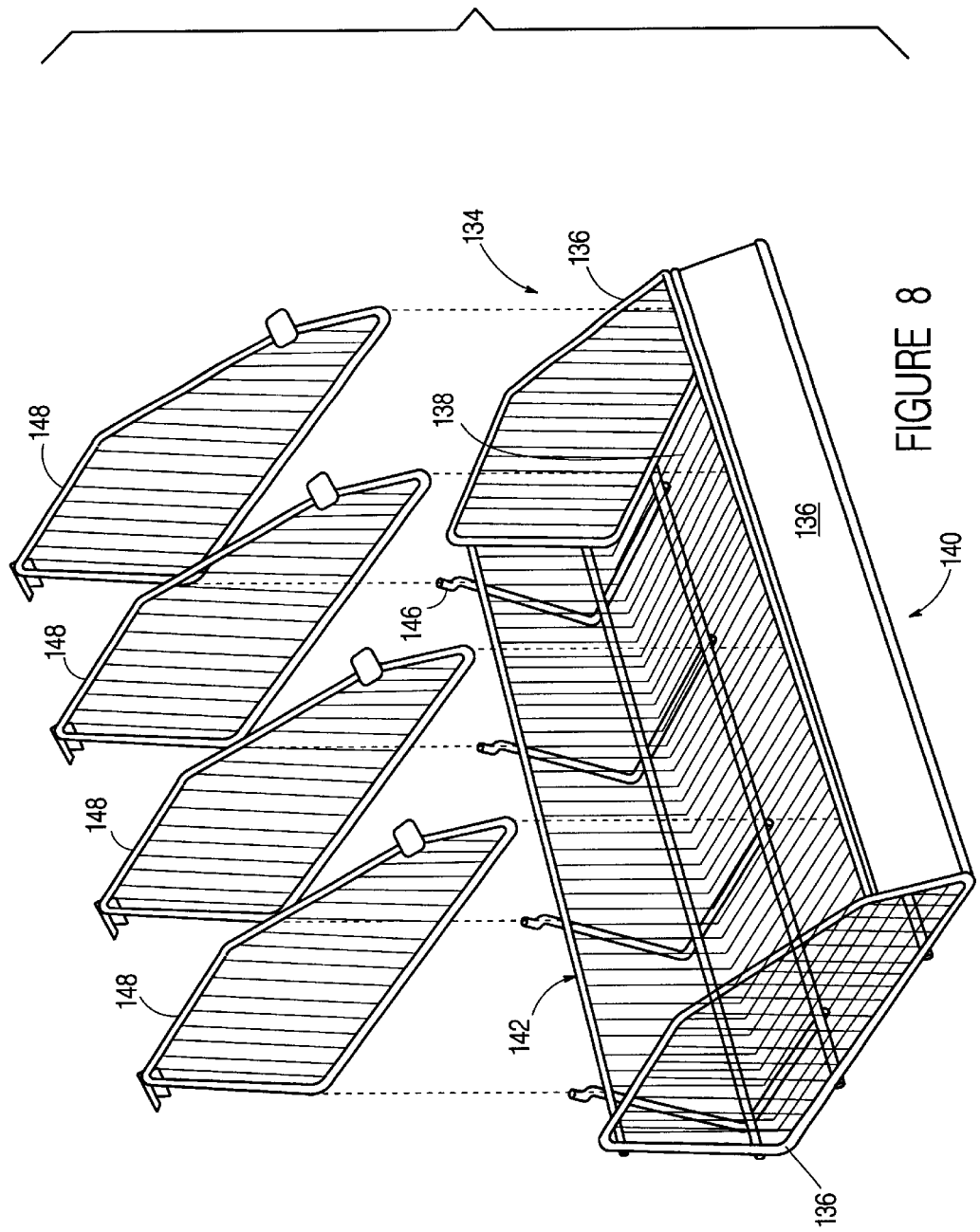
FIG. 8 is a perspective view of a container for the display system according to an exemplary embodiment.
Figure 9:
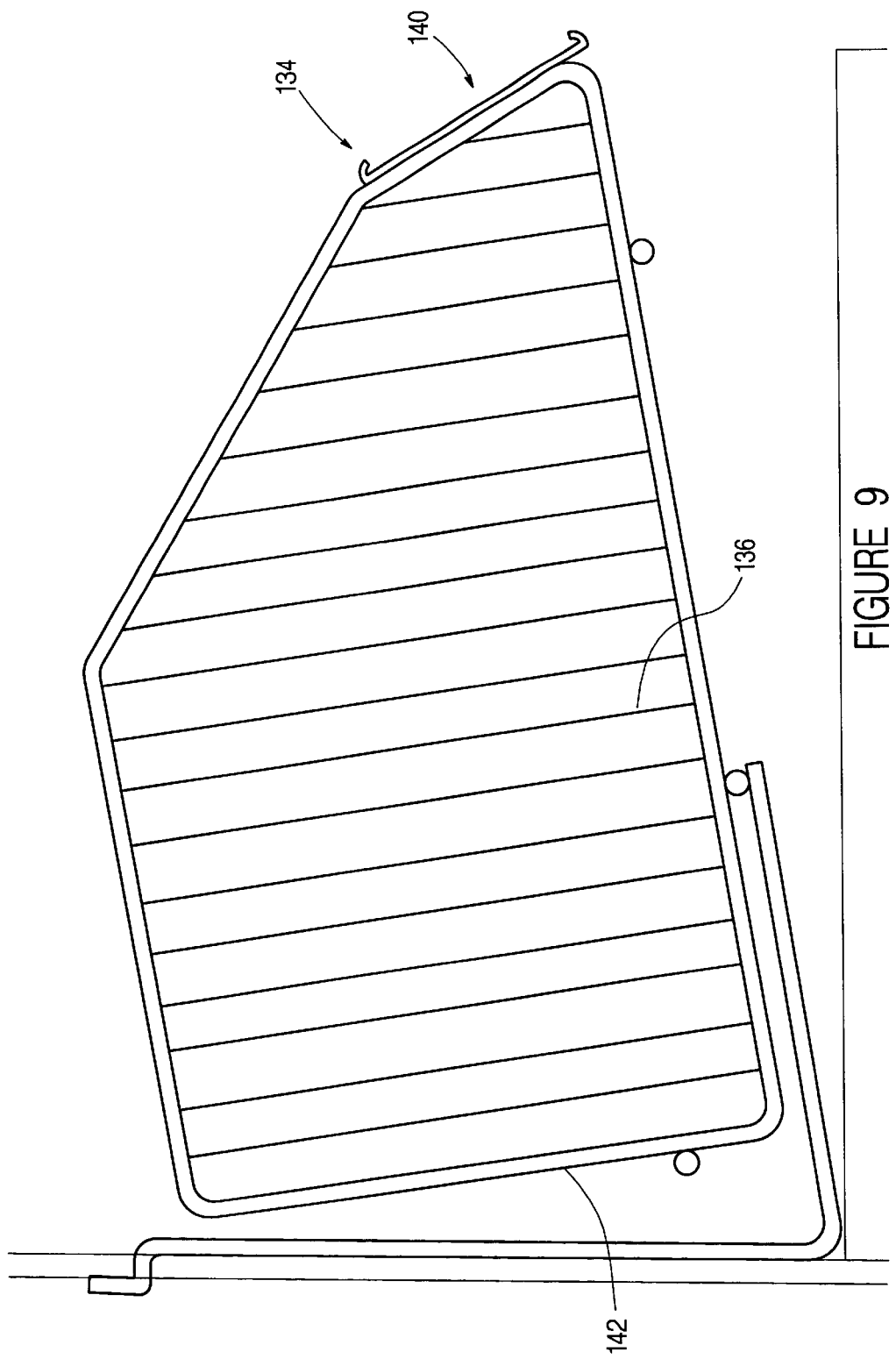
FIG. 9 is a side elevation view of the container as illustrated in FIG. 8.

Module 12c, as shown in FIGS. 8 and 9, is configured to display small wares organized in a bin or basket 134. Basket 134 includes a plurality of compartments 136 configured to display a variety of products and provide for efficient stocking by the retail stock person and for easy selection by the consumer. A front display bracket 136 is coupled to basket 134 and configured to receive a display card 138. Space 140 may be left below baskets 134 to store larger items. Basket 134 is a wire frame structure having sides 136, bottom 138, front 140, and back 142. Display bracket 136 is located on front 140 and a plurality of hooks 146 extend from back 142 and are configured to engage pegboard 34. One or more dividers 148 are selectively placed between sides to provide plurality of compartments 136.

Using the same module 12a, 12b, 12c, the retailer may change the displayed product by changing the display card, and the products, and repositioning the display if necessary.

It is also important to note that terms "information board," "information terms display," and "graphical information" are not intended to be terms of limitation, but are intended to be interpreted broadly to include any information desirable or helpful to consumers and/or retailers, and in any of a variety of formats, mediums, and the like. The description of using such information is intended to provide the consumer with product information is not limited to a particular device, apparatus, or fixture, but is meant to cover any apparatus or system that may be configured to operate in the system described herein including other methods of dissemination of information, including graphical, pictorial, animated, video, etc.

It is also important to note that the construction and arrangement of the elements of the apparatus and method of merchandising products as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A modular display system for product display within a store, the display system comprising:

a plurality of first product display modules adapted to display one or more first cleaning products having a first use, each one of the first product display modules disposed immediately adjacent to another one of the first product display modules;

at least one second product display module disposed adjacent to a selected one of the first product display modules, the at least one second product display module adapted to display one or more second cleaning products having a second use different from the first use, wherein the second product display module is a carousel having a frame supporting a surface adapted to display one or more second cleaning products;

an information display supported by at least one of the first product display modules and adapted to display first information related to one or more of the first cleaning products and second information related to one or more of the second cleaning products; and wherein the first information associates each of the second cleaning products with a particular one of the first cleaning products.

2. The modular display system of claim 1, wherein one or more of the second cleaning products is at least one of a replacement part, an accessory part, and a refill part for one or more of the first cleaning products.

3. The modular display system of claim 1, wherein the carousel includes a basket adapted to be adjustably divided into a plurality of compartments.

4. The modular display system of claim 3, wherein the basket comprises a display bracket adapted to receive a display card.

5. The modular display system of claim 1, further comprising a third product display module having a basket adapted to be adjustably divided into a plurality of compartments.

6. The modular display system of claim 5, wherein the basket comprises a display bracket adapted to receive a display card.

7. A method for displaying related products within a store, the method comprising the steps of:

displaying one or more first cleaning products utilizing a plurality of first product display modules, each of the first product display modules being disposed immediately adjacent to the next adjacent first product display module, wherein each of the one or more first cleaning products has a first use;

vertically displaying a plurality of stick cleaning products within at least one of the plurality of first product display modules, and wherein the first product display module comprises a support structure adapted to display the stick cleaning products, the support structure having a tube assembly supported by a frame;

displaying a plurality of second cleaning products adjacent to a selected one of the first product display modules, the plurality of second cleaning products having a second use different from the first use;

displaying first information related to one or more of the first cleaning products on a display supported by at least one of the first product display modules;

displaying second information related to one or more of the second cleaning products on the display; and displaying third information related to the association of one or more of the second cleaning products with a particular one of the first cleaning products.

8. The method of claim 7, wherein the tube assembly comprises an upper plate, a lower plate, and one or more tubular sleeves, the upper plate including one or more apertures sized to receive one or more of the plurality of stick cleaning products.

9. The method of claim 7, wherein the frame further comprising a horizontal support surface vertically shiftable between a plurality of positions.

10. The method of claim 9, further comprising the step of vertically displaying the plurality of stick cleaning products of different lengths, wherein the tube assembly is shiftable between a first position, wherein the tube assembly is supported above the horizontal support surface and is adapted to display a stick cleaning product of a first length, and a second position, wherein the tube assembly is supported below the horizontal support surface and is adapted to display a stick cleaning product of a second length longer than the first length.

11. A modular display system for displaying cleaning products within a store, the display system comprising:

a plurality of first product display modules having a tube assembly adapted to vertically display a plurality of stick products having a first use, each one of the first product display modules disposed immediately adjacent to another one of the first product display modules, at least one of the first product display modules having a horizontal support surface vertically shiftable between a plurality of positions;

and at least one second product display module disposed adjacent to a selected one of the first product display modules, each of the second product display modules being dissimilar to the first product display module and being adapted to display one or more cleaning products having a second use different from the first use;

an information display supported by at least one of the first product display modules and adapted to display first information related to one or more of the stick products and second information related to one or more of the cleaning products, wherein the first information associates each of the cleaning products with a particular one of the stick products.

12. The modular display system of claim 11, wherein the tube assembly is shiftable between a first position, wherein the tube assembly is supported above the horizontal support surface, and a second position, wherein the tube assembly is supported below the horizontal support surface.

13. The modular display system of claim 11, wherein the support structure further comprises a mounting bracket coupled to the frame and adapted to receive an information display panel, the information display panel adapted to receive at least one of the first information and the second information.

14. A modular display system for product display within a store, the display system comprising:

a plurality of first product display modules adapted to display one or more first cleaning products having a first use, each one of the first product display modules disposed immediately adjacent to another one of the first product display modules, wherein the first product display module comprises a support structure adapted to vertically display a plurality of stick cleaning products, the support structure having a tube assembly supported by a frame;

at least one second product display module disposed adjacent to a selected one of the first product display modules, the at least one second product display module adapted to display one or more second cleaning products having a second use different from the first use;

an information display supported by at least one of the first product display modules and adapted to display first information related to one or more of the first cleaning products and second information related to one or more of the second cleaning products; and wherein the first information associates each of the second cleaning products with a particular one of the first cleaning products.

15. The modular display system of claim 14, wherein the tube assembly comprises an upper plate, a lower plate, and one or more tubular sleeves, the upper plate including one or more apertures sized to receive one or more of the plurality of stick cleaning products.

16. The modular display system of claim 14, wherein the frame further comprises a horizontal support surface vertically shiftable between a plurality of positions.

17. The modular display system of claim 16, wherein the tube assembly is shiftable between a first position, wherein the tube assembly is supported above the horizontal support surface, and a second position, wherein the tube assembly is supported below the horizontal support surface.

18. The modular display system of claim 14, wherein the support structure further comprises a mounting bracket coupled to the frame and adapted to receive an information display panel, the information display panel adapted to receive at least one of the first information and the second information.

* * * * *

UNITED STATES PATENT AND TRADEMARK OFFICE
CERTIFICATE OF CORRECTION

PATENT NO. : 6,850,208 B1
DATED : February 1, 2005
INVENTOR(S) : Anthony B. Ferrante It is certified that error appears in the above-identified patent and that said Letters Patent is hereby corrected as shown below:

Title page,
Item [54], Title, please delete "MERCHANDIZING" and replace with
-- MERCHANDISING --.
Item [57], ABSTRACT,
Lines 11-12, please delete "merchandizing" and replace with -- merchandising --.

Signed and Sealed this

Fifteenth Day of November, 2005

JON W. DUDAS
*Director of the United States Patent and Trademark Office*